(12) United States Patent
Schmitt

(10) Patent No.: US 10,363,894 B2
(45) Date of Patent: Jul. 30, 2019

(54) ROLLOVER PROTECTION DEVICE

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 113 days.

(21) Appl. No.: 15/622,404

(22) Filed: Jun. 14, 2017

(65) Prior Publication Data

US 2017/0361798 A1    Dec. 21, 2017

(30) Foreign Application Priority Data

Jun. 21, 2016  (DE) .................. 10 2016 111 352

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01); *B60R 2021/0048* (2013.01); *B60R 2021/132* (2013.01); *B60R 2021/134* (2013.01); *B60Y 2410/124* (2013.01)

(58) Field of Classification Search
CPC . B60R 21/13; B60R 21/131; B60R 2021/132; B60R 2021/134; B60R 2021/135; B60R 2021/0018; B60R 2021/0048; B60R 2021/0273; B60Y 2410/124

USPC ......................................................... 280/756
See application file for complete search history.

(56) References Cited

U.S. PATENT DOCUMENTS

2006/0290124 A1* 12/2006 Kasubke ................ B60R 21/13
                                                                     280/756

FOREIGN PATENT DOCUMENTS

| DE | 202 15 275 | | 1/2003 |
| DE | 102 10 957 | | 10/2003 |
| DE | 10210957 | C1 * | 10/2003 |
| DE | 102 42 832 | | 3/2004 |
| DE | 10 2009 011 066 | | 9/2010 |
| DE | 102009011066 | A1 * | 9/2010 |
| DE | 10 2009 039 215 | | 3/2011 |
| DE | 102009039215 | A1 * | 3/2011 |

OTHER PUBLICATIONS

Wikipedia article for "Forging"; https://en.wikipedia.org/wiki/Forging; Jan. 22, 2019.*
German Search Report dated Feb. 23, 2017.

* cited by examiner

*Primary Examiner* — Keith J Frisby
(74) *Attorney, Agent, or Firm* — Gerald E. Hespos; Michael J. Porco; Matthew T. Hespos

(57) ABSTRACT

A rollover protection device (1) for a passenger car has a supporting device (3) that extends vertically when installed properly. A crossmember (5) is secured on the supporting device (3) and extends in a lateral direction (4) when installed properly. The crossmember (5) is of beam-shaped design and comprises a die-cast, low-pressure die-cast or forged unit (6).

10 Claims, 2 Drawing Sheets

ROLLOVER PROTECTION DEVICE

CROSS REFERENCE TO RELATED APPLICATION

This application claims priority under 35 USC 119 to German Patent Appl. No. 10 2016 111 352.2 filed on Jun. 21, 2016, the entire disclosure of which is incorporated herein by reference.

BACKGROUND

1. Field of the Invention

The invention relates to a rollover protection device for a passenger car. The rollover protection device has a supporting device that extends in an upward direction when installed properly. A crossmember is secured on the supporting device and extends in a lateral direction when installed properly.

2. Description of the Related Art

Many rollover protection devices for passenger cars have been disclosed in the prior art. For example, DE 102 42 832 A1 shows a three-part rollover bar for motor vehicles. A motor vehicle that turns over will roll on the rollover bar. The rollover bar comprises three bar components, namely two bar leg tubes and a bar head of tubular and U-shaped configuration. The bar leg tubes are screwed to the tubular bar head at associated connection points. The rollover bar and the bar leg tubes can be metal die castings, metal forgings or fibre-reinforced plastic parts. The disadvantage of this prior art is that only a small side region is covered. Moreover, there can be an unfavorable ratio of utilization of material to deformation capacity.

It is therefore the object of the invention to provide a rollover protection device with improved properties.

SUMMARY

A rollover protection device according to the invention is provided for a passenger car and comprises a supporting device and a crossmember. The supporting device extends in an upward direction when installed properly. The crossmember is secured on the supporting device and extends in a lateral direction when installed properly. The crossmember is of substantially beam-shaped design that has generous rounded portions, and may comprise a die-cast and/or low-pressure die-cast or forged unit.

The rollover protection device of the invention has many advantages. For example, the crossmember is of beam-shaped design. Thus, the crossmember can cover a significant width to provide a large contact area, thereby allowing an optimum ratio of utilization of material to deformation capacity. The use of a die-cast unit or a forged unit as a crossmember opens up a large number of design possibilities. Moreover, there is the advantage that the avoidance of sharp edges avoids the need for an additional covering.

The rollover protection device is suitable for passenger cars, commercial vehicles and especially for cabriolets. There is optimum utilization of the installation space. In all the embodiments, the crossmember may comprise one or more crossmember parts. In this case, each individual crossmember part can be a die casting or a forging.

The crossmember may comprise at least one recess and, in particular plural recesses. The recesses may extend transversely to a longitudinal extent of the crossmember and can be formed by cold deformation. It is also possible to produce the recesses by a forging method. The recesses also can be produced by a die-casting method or by cold deformation, or can be finish-machined.

A crossmember provided with plural recesses advantageously combines high stability with a high deformation capacity. As a result, large forces can be absorbed. Considerable energy dissipation by the rollover protection device is made possible while, at the same time, effective protection of the occupants of a passenger vehicle is achieved.

The recesses may extend substantially in a longitudinal direction of the passenger car.

The recesses can achieve optimum utilization of material. Minimal and uniform wall thicknesses between the recesses are made possible. It is thereby possible to achieve a continuous and high deformation capacity while, at the same time, high and extremely high forces can be absorbed and dissipated. The total weight can be reduced. Sharp edges are avoided by suitable rounding.

The individual recesses can be embodied as blind holes or as through holes. In particular, at least two recesses may be arranged directly adjacent to one another. The two adjacent recesses are separated from one another by a single partition wall.

At least one recess can have a closed bottom. For example, the bottom of a recess can be closed by a cover. However, it is also possible for a recess to receive a continuous bottom at one end during production. The openings of the recesses may be aligned alternately toward the front and toward the rear of the crossmember. Thus, the longitudinal axes of the recesses each may extend approximately parallel to a longitudinal axis of the passenger car. Recesses that are open alternately to the front and to the rear side enable a stable crossmember that can absorb and dissipate enormous forces.

Each recesses may form a chamber. The chambers can be designed to be open on one side. In particular, a crossmember has a multiplicity of chambers. In one embodiment, the number of chambers is an uneven number. In particular, the number of chambers is between 5 and about 11 and preferably 5 or 6.

A partition wall may be formed between two chambers. The partition wall may slope relative to the vertical when the cross member is installed properly. A mean angle at the partition wall is preferably between about 0° and 45° relative to the vertical. In particular, the angle is between 5° and 45°. The partition walls alternately may have a particular alignment. Thus, for example, the partition walls can be designed alternately to slope by plus 45° and minus 45° or even by 0° and 45° relative to the vertical.

The supporting device and/or the crossmember may be adjustable in height. For example, the crossmember can be adjustable in height together with the supporting device. However, the crossmember may be adjustable in height relative to the supporting device. It is then possible to perform adaptation to the respective situation and/or user.

The crossmember may comprises at least two interconnected crossmember parts. The crossmember parts may be welded to one another.

At least two crossmember parts may have hook-shaped portions that are interlocked. The crossmember parts can be welded to one another. It is also possible for the crossmember parts to be welded to one another and additionally for each of them to have hook-shaped portions that are interlocked.

The crossmember may have at least one lateral arched overhang to achieve higher elasticity, improved flexibility and increased contact area.

The supporting device may comprise at least one vertical member, and a collar may be formed on the crossmember. The collar may fit around the vertical member at the front and rear, and possibly laterally.

The crossmember may be anchored positively on the supporting device. In this case, the cross member and the supporting device can be connected positively to one another. In particular, the crossmember may engage positively in an inner profile of the vertical member.

A crossmember that is a forging, die casting of sufficient elongation or a low-pressure die casting provides advantageous rollover protection. Further avoiding sharp edges can eliminate the need for an additional covering.

The recesses in the crossmember allow optimum utilization of material with minimal and/or advantageous uniform wall thicknesses. This leads to a continuous deformation capacity. The total weight can be reduced.

Stability and utility can be increased by an alternate wall structure, in which the recesses are alternately open towards the front and the rear.

Maximum height and maximum width can be achieved. A lateral arched overhang allows better flexibility and a sufficient contact area.

A collar on the crossmember, at least in the region of an inner profile of the supporting device or of the vertical member, allows improved retention of the crossmember on the supporting device.

A relatively large number of recesses achieves a considerable weight saving and increased protection for the occupants of a passenger car.

A positive engagement of the crossmember on the inner profile reduces the number of weld seams.

Further advantages and features of the invention will become apparent from the illustrative embodiments that are explained below with reference to the figures.

DETAILED DESCRIPTION

Figure 1:
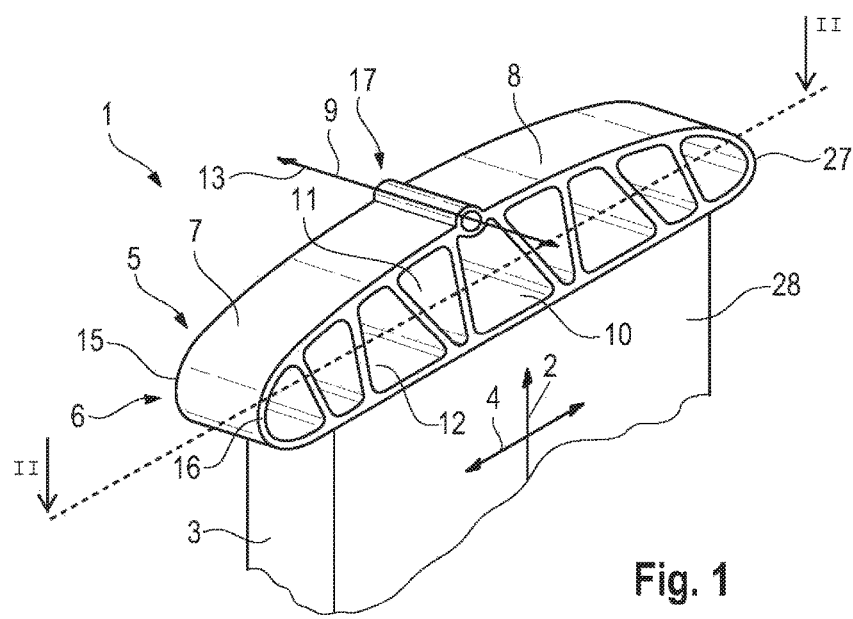
FIG. 1 is a perspective view of a rear side of a rollover protection device according to the invention.

FIG. 1 shows a first embodiment of a rollover protection device 1 that comprises a supporting device 3 extending substantially in a vertical direction 2. The supporting device 3 comprises a vertical member 28 that extends in the vertical direction 2. A crossmember 5 extends transverse to the supporting device 3 in a lateral direction 4, and comprises lateral recesses 10 to 12 (nine lateral recesses in this case).

The recesses 10 to 12 extend substantially parallel to the longitudinal extent of the crossmember and to the longitudinal extent of a passenger car when the rollover protection device 1 and the crossmember 5 are installed in a vehicle. Arched overhangs 27 are provided in the lateral regions, increasing the contact area and also the deformability and load-bearing capacity of the rollover protection device 1. The radii of the arched overhangs 27 can also be made significantly larger.

The illustrated crossmember 5 is integral, but can also comprise two different crossmember parts 7, 8 that are connected to one another at a suitable fastening. The fastening 17 of the rear window penetration element can also be seen here. A conical washer, for example, can be provided as a glass penetration element. It is also possible for a vertical or substantially vertical wall to be formed centrally in order to support the cone in a vertical direction.

The illustrated recesses 10 to 12 extend from the rear 16 to the front 15. An end wall can be provided on the front side 15 to increase stiffness. It is also possible for the recesses to be designed as through holes, given careful rounding.

Figure 2:
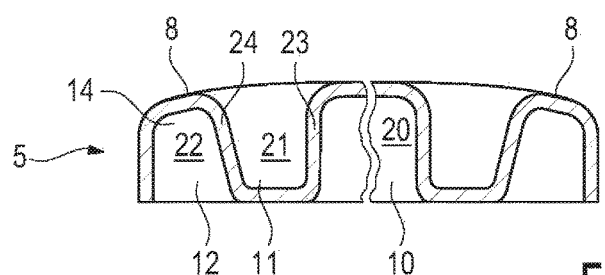
FIG. 2 is a schematic vertical section along the line II-II in FIG. 1.

FIG. 2 is a schematic cross section that depicts the individual chambers 20 to 22 of the individual recesses 10 to 12.

Figure 3:
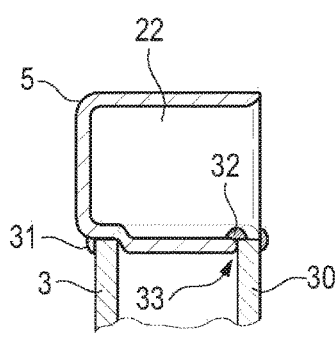
FIG. 3 is a longitudinal section through a lateral region of the rollover protection device 1 shown in FIG. 1.

FIG. 3 is an enlarged detail, where the connection of the crossmember 5 or the crossmember part 7 to an inner profile 30 of a supporting device 3 can be seen. The crossmember 5 is welded to the inner profile 30 and thus to the supporting device 3. In this case, the inner profile 30 is welded to the crossmember 5 by a top weld seam 31. In addition, an anchoring point 33 can form a positive-locking feature on the supporting device 3 over a certain section. It is also possible for an additional weld seam 32 to be provided.

Figure 4:
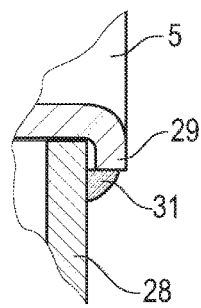
FIG. 4 is an enlarged detail of an alternative embodiment.

The crossmember 5 may have a collar 29, e.g. an encircling collar 29, as illustrated in FIG. 4, to achieve a positive connection between the crossmember 5 and the supporting device 3 or the inner profiles 30 of the supporting device 3. The main weld seam 31 can be provided on the encircling collar.

An alternative embodiment is also possible where the crossmember 5 has, for example, a hook-shaped portion or at least one hook-shaped portion that interacts with a correspondingly matching hook-shaped portion of another crossmember part 7 or 8 so that the hook-shaped portions result in a fastening overall.

Figure 5:
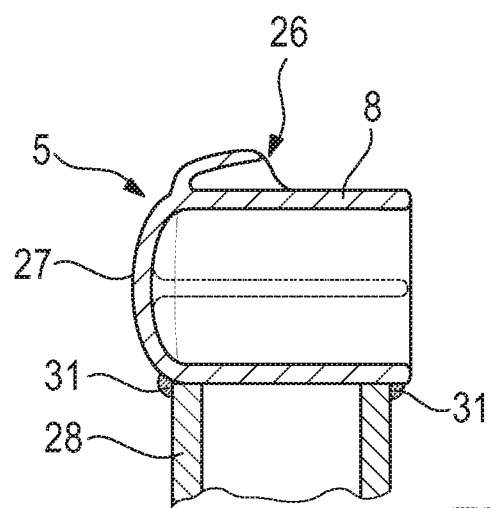
FIG. 5 is a schematic illustration of another illustrative embodiment of a rollover protection device according to the invention.

FIG. 5 shows a variant in which a portion 26 increases the extension height. In the retracted state, the installation space can be used over the entire width.

The crossmember may comprise two crossmember parts 7 and 8 that are fastened to one another at a fastening point 17. In this case, hook-shaped portions 25 and 26 can engage one another or can optionally be welded to one another to provide the necessary stability. The crossmember 5 is arranged on the supporting device 3.

Figure 6:
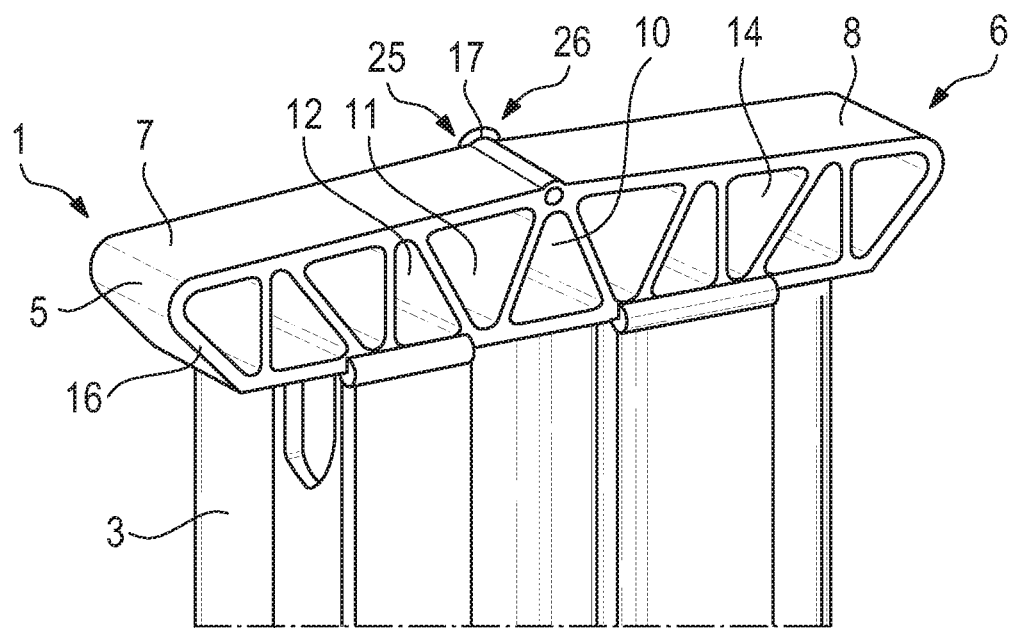
FIG. 6 is a schematic perspective view of a front side of another rollover protection device according to the invention.

The crossmember 5 in FIG. 6 has a multiplicity of recesses 10 to 12. The recesses 10 to 12 extend alternately from the front 15 or from the rear 16 into the crossmember 5. A single relatively thin wall 23 or 24 exists between two adjacent recesses 10, 12. The alternating arrangement of the recesses 10 and 11 has the bottoms 14 of the respective recesses situated alternately on the front 15 and on the rear 16. As a result, a low weight with a high stability is possible. At the same time, a large width and hence a large contact area optionally can be achieved.

A reduction in the number of weld seams is optionally possible by anchoring or positive engagement between the crossmember and the supporting device 3 or the inner profile 30 of the vertical member 28.

Production as a die casting, low-pressure die casting or as a forging makes possible varied and simple machining, thus allowing a saving of effort and costs.

LIST OF REFERENCE SIGNS 1 rollover protection device
2 upward direction 3 supporting device
4 lateral direction
5 crossmember
6 die-cast or forged unit
7 crossmember part
8 crossmember part
9 longitudinal extent of 5
10 recess
11 recess
12 recess
13 longitudinal direction
14 bottom
15 front side
16 rear side
17 fastening of the rear window penetration element
20 chamber
21 chamber
22 chamber
23 partition wall
24 partition wall
25 portion
26 portion
27 arched overhang
28 vertical member
29 collar
30 inner profile

What is claimed is:

1. A rollover protection device for a passenger car, comprising: a supporting device that extends in an upward direction when installed properly, and a crossmember secured on the supporting device and extending in a lateral direction when installed properly, the crossmember defining a beam shape with rounded portions and defining a die-cast, low-pressure die-cast or forged unit, the crossmember having recesses arranged adjacent to one another in the lateral direction, each of the recesses extending substantially in a longitudinal direction of the passenger car when installed properly, the recesses comprising a first plurality of recesses with closed front ends and open rear ends and a second plurality of recesses with closed rear ends and open front ends, the recesses of the first plurality alternating with the recesses of the second plurality so that each recess with a closed front end is adjacent at least one recess with a closed rear end.

2. The rollover protection device of claim 1, wherein the recesses are formed substantially directly adjacent to one another on the crossmember.

3. The rollover protection device of claim 1, wherein the recesses form between 5 and 11 chambers.

4. The rollover protection device of claim 3, wherein a partition wall is formed between two chambers, the partition wall sloping relative to vertical.

5. The rollover protection device of claim 1, wherein the supporting device and/or the crossmember are adjustable in height.

6. The rollover protection device of claim 1, wherein the crossmember is of integral design.

7. The rollover protection device of claim 1, wherein the crossmember comprises at least two interconnected crossmember parts that are welded to one another.

8. The rollover protection device of claim 1, wherein the crossmember has at least one lateral arched overhang.

9. The rollover protection device of claim 1, wherein the supporting device comprises a vertical member and wherein a collar is formed on the crossmember, the collar fitting around the vertical member.

10. The rollover protection device of claim 1, wherein the crossmember is anchored positively on the supporting device.

* * * * *